United States Patent [19]
Chandra

[11] 3,887,599
[45] June 3, 1975

[54] COMPLEXES CONTAINING SULPHUR

[75] Inventor: Grish Chandra, Penarth, Wales

[73] Assignee: Dow Corning Limited, Barry Glamorgan, Wales

[22] Filed: Oct. 29, 1973

[21] Appl. No.: 410,943

[30] Foreign Application Priority Data
Nov. 11, 1972 United Kingdom........... 52202/72

[52] U.S. Cl. ... 260/429 R; 252/431 R; 260/448.2 B
[51] Int. Cl. ............................................. C07f 15/00
[58] Field of Search ................................ 260/429 R

[56] References Cited
UNITED STATES PATENTS
3,502,731  3/1970  Peterson ........................ 260/609 R
3,597,463  8/1971  Peterson...................... 260/448.2 E
3,657,373  4/1972  Peterson ........................... 260/677
3,763,197  10/1973  Collier ........................... 260/429 R
3,772,347  11/1973  Atwell et al.................. 260/448.2 E Primary Examiner—Arthur P. Demers
Attorney, Agent, or Firm—Robert F. Fleming, Jr.

[57] ABSTRACT

Silicon-containing platinum (II) complexes represented by the general formula $$[PtX_2(SR'R'')_2]$$

in which X represents Cl, Br or I, R' represents the $R_3SiQ$— group in which R is alkyl, aryl, aralkyl, alkaryl or trimethylsilyl and Q represents a divalent aliphatic hydrocarbon radical, and R' represents alkyl, aryl, aralkyl, alkaryl or $R_3SiQ$—.

7 Claims, No Drawings

COMPLEXES CONTAINING SULPHUR

This invention relates to new and useful complexes containing silicon and sulphur.

According to the invention there are provided platinum (II) complexes represented by the general formula $$[PtX_2(SR'R'')_2]$$

in which X represents Cl, Br, or I, R' represents the $R_3SiQ-$ group in which R represents an alkyl, aryl, aralkyl or alkaryl radical having from 1 to 18 inclusive carbon atoms or a $(CH_3)_3Si-$ group, not more than one R being $(CH_3)_3Si-$, and Q represents a divalent aliphatic hydrocarbon radical having from 1 to 6 inclusive carbon atoms and R'' represents an alkyl, aryl, aralkyl or alkaryl radical having from 1 to 18 inclusive carbon atoms or the $R_3SiQ-$ group in which R and Q are as defined above.

In the general formula of the complexes of this invention each R and R'' represents an alkyl, aryl, aralkyl or alkaryl radical having from 1 to 18 inclusive carbon atoms. Examples of such radicals are methyl, ethyl, propyl, butyl, n-octyl, tetradecyl, phenyl, napthyl, benzyl and 2-phenylethyl. Preferably the R and R'' radicals are those having less than 8 carbon atoms. The substituent R may also represent the $(CH_3)_3Si-$ group, but not more than one R in $R_3SiQ-$ should be the trimethylsilyl group. In the group $R_3SiQ-$ the substituent Q may be any divalent aliphatic hydrocarbon radical having from 1 to 6 inclusive carbon atoms, for example $-CH_2-$, $-CH_2CH_2-$, $-CH_2CH(CH_3)CH_2-$, or cyclohexylene.

The complexes of this invention in which X represents chlorine may be prepared by reacting in an aqueous medium (i) an alkali metal chloroplatinite or ammonium chloroplatinite with (ii) a silicon-containing sulphide of the general formula R'R''S wherein R' and R'' are as defined hereinabove. The reaction is illustrated by the following equation $$Na_2PtCl_4 \cdot 4H_2O + 2R'R''S \rightarrow (R'R''S)_2 PtCl_2 + 2NaCl + 4H_2O$$

As reactant (i) there may be employed for example sodium chloroplatinite, potassium chloroplatinite or ammonium chloroplatinite. In view of their ready availability the sodium and potassium chloroplatinites are preferred.

The silicon-containing sulphides R'R''S employed as reactant (ii) in the preparative process are, in general, known materials. They may be prepared for example according to the process described in the Journal of Organic Chemistry, 1952, 17, 1393. Specific examples of the operative sulphides are $$(CH_3)_3SiCH_2SC_2H_5$$

$$(CH_3)_3SiCH_2SCH_2Si(CH_3)_3$$

$$C_6H_5CH_2Si(CH_3)_2(CH_2)_2S(n-C_4H_9)$$

and $$(C_2H_5)_3Si(CH_2)_3SCH_3$$

The reaction between (i) and (ii) will proceed at or below room temperature but may, if desired, be expedited by the application of heat. It is preferred to expedite the reaction by acidifying the reaction mixture, for example by the addition of a small proportion of 2.5 N HCl. The relative proportions of the reactants (i) and (ii) employed is not critical but stoichiometric proportions are preferably used.

As the aqueous reaction medium there may be used water or, more preferably, both water and a water-miscible, inert organic solvent, for example an alcohol e.g. methanol or ethanol, or acetone. Conveniently the reaction is carried out by mixing at a temperature in the range from about 10 to about 40°C, an aqueous solution of the chloroplatinite (i) with a solution of the sulphide (ii) in a water-miscible organic solvent and shaking or stirring the mixture. The desired complex separates from the aqueous medium and may be purified by washing with water and recrystallisation from an organic solvent.

The complexes of this invention may exist as one or both of the cis and trans stereo-isomers which may be separated and isolated if desired by crystallisation from an organic solvent.

Complexes wherein X represents bromine or iodine may be obtained from the corresponding chlorine-containing complexes by metathetical reactions employing an alkali metal bromide or iodide, as illustrated in the following equation $$PtCl_2(R'R''S)_2 + 2NaBr \xrightarrow{acetone} PtBr_2(R'R''S)_2 + 2NaCl$$

The complexes of this invention are useful as catalysts for hydrosilylation reactions, that is reactions involving the addition of silicon-bonded hydrogen atoms to unsaturated radicals.

Included within the scope of this invention therefore is a process for the preparation of an organosilicon product which comprises reacting in the presence of a sulphur containing complex of the invention (a) an organosilicon material having in the molecule at least one silicon-bonded hydrogen atom, and (b) a compound containing aliphatic carbon atoms linked by multiple bonds.

As the organosilicon material (a) there may be employed for example one or more silanes or siloxanes. Examples of such materials are $CH_3SiHCl_2$, $C_6H_5SiHCH_3Br$, $(CH_3)_2SiHCl$, $C_2H_5SiH_2Cl$, $CH_3SiH(OCH_3)_2$, methylhydrogen polysiloxanes and copolymers of methylhydrogensiloxane units and, for example, dimethylsiloxane units, trimethylsiloxane units and phenylethylsiloxane units. The nature of any silicon-bonded organic radicals present in the silicon-containing material (i) is not critical but normally such radicals will comprise monovalent hydrocarbon or halogenated hydrocarbon radicals free of aliphatic unsaturation and containing from 1 to 18 inclusive carbon atoms.

The compound (b) containing carbon atoms linked by multiple bonds may be organic, for example, pentene-1, heptene-1, acetylene, butadiene, vinylacetylene, cyclohexene, styrene, allyl bromide, vinyl acetate, or allyl alcohol, or it may be organosilicon, for example $(CH_3)_2(CH_2=CH)SiCl$, $(CH_2=CHCH_2)_2SiBr_2$, $CH_2=CHSi(C_2H_5)_2Cl$, and organosiloxanes and polysiloxanes containing silicon-bonded vinyl and/or allyl radicals. Any remaining organic radicals in the unsaturated organosilicon reactant may be for example, monovalent hydrocarbon or halogenated hydrocarbon radicals free of aliphatic unsaturation, preferably those having from 1 to 18 inclusive carbon atoms.

The reaction of silicon-bonded hydrogen atoms with unsaturated radicals is well known and may be employed for the preparation of organofunctional and other organosilicon compounds and in the preparation of elastomeric or resinous organosilicon products. The hydrosilylation reaction may be performed at temperatures ranging from below 20°C up to and in excess of 150°C.

The following examples in which Me represents the methyl radical, Vi the vinyl radical, Bu the n-butyl radical and Ph the phenyl radical, illustrates the invention.

EXAMPLE 1.

$$Na_2PtCl_4 + 2Me_3SiCH_2SCH_2CH_3 \rightarrow trans\text{-}(Me_3SiCH_2SCH_2CH_3)_2PtCl_2 + 2NaCl$$

A solution of $Me_3SiCH_2SCH_2CH_3$ (2.96 g., 2 mol.) in ethanol (5 ml.) was added to $Na_2PtCl_4$ (3.83 g., 1 mol.) in a mixture of ethanol (45 ml.) and water (35 ml.) acidified with 2.5 N HCl (2 ml.). The mixture was shaken for 1.5 hr. The complex which separated out was recovered by filtration, washed with water (3 × 10 ml.) and then crystallized from acetone. Finally, yellow needles (2.3 g., 41%) were obtained. (Found: C, 26.0; H, 5.6; Cl, 13.0; S, 11.6. $C_{12}H_{32}Cl_2Si_2S_2Pt$ requires C, 25.6; H. 5.7; Cl, 12.6; S, 11.4%).

EXAMPLE 2.

A mixture consisting of $(Me_3SiO)_2SiMeH$ (0.56 g., 1 mol.) $Me_3SiOSiMe_2Vi$ (0.43 g., 1 mol.), and $(Me_3SiCH_2SCH_2CH_3)_2PtCl_2$ (5 μl of 2.6% by weight solution in toluene) was heated at 80°C for 10 minutes. Analysis (g.l.c.) of the reaction mixture showed the presence of $(Me_3SiO)_2SiMeCH_2CH_2SiMe_2OSiMe_3$ (~ 90 percent) resulting from the addition of ≡ SiH groups to ≡ SiVi groups.

EXAMPLE 3.

$$Na_2PtCl_4 + 2(Me_3SiCH_2)_2S \rightarrow trans\text{-}[(Me_3SiCH_2)_2S]_2PtCl_2 + 2NaCl$$

$(Me_3SiCH_2)_2S$ (0.86 g., 2 mol.) was added to $Na_2PtCl_4$ (0.8 g., 1 mol.) in a mixture of ethanol (15 ml.) and water (10 ml.) acidified with 2.5 N HCl (0.6 ml.). The mixture was shaken for about 20 hours. The orange solid which separated out was recovered by filtration, washed with $H_2O$ (5 × 5 ml.) and then crystallised from ethanol. Finally, yellow-orange crystals m.p. 95°–6°C, (0.83 g., 59%) were obtained. (Found: C, 28.35; H, 6.5; Cl, 10.6; S, 9.6. $C_{16}H_{44}Cl_2Si_4S_2Pt$ requires C, 28.3; H, 6.5; Cl, 10.5; S, 9.4%).

EXAMPLE 4.

$$Na_2PtCl_4 + 2Me_3SiCH_2SBu \rightarrow trans\text{-}(Me_3SiCH_2SBu)_2PtCl_2 + 2NaCl$$

$Na_2PtCl_4$ (3.83 g., 1 mol.) was shaken with the sulphide (3.52 g., 2 mol) in a mixture of water (50 ml.) and ethanol (20 ml.), acidified with 2.5N HCl (2 ml.), for 20 hours. An orange-coloured solid separated which was filtered, washed with water and recrystallised from 95percent ethyl alcohol to yield yellow crystals (1.9 g., 30.7 percent) of the sulphide complex.

EXAMPLE 5.

The procedure of Example 2 was repeated except that the platinum complex employed therein was replaced in turn by each of the complexes prepared in Examples 3 and 4. In both cases the addition of ≡ SiH groups to ≡ SiVi groups occurred to yield $(Me_3SiO)_2SiMeCH_2CH_2SiMe_2OSiMe_3$.

That which is claimed is:

1. Platinum (II) complexes represented by the formula $$PtX_2(SR'R'')_2$$

in which X represents Cl, Br or I, R' represents the $R_3SiQ$— group in which R represents an alkyl, aryl, aralkyl or alkaryl radical having from 1 to 18 inclusive carbon atoms and Q represents a divalent aliphatic hydrocarbon radical having from 1 to 6 carbon atoms inclusive and R'' represents an alkyl, aryl, aralkyl or alkaryl radical having from 1 to 18 inclusive carbon atoms or the $R_3SiQ$— group in which R and Q are as hereinabove defined.

2. Platinum (II) complexes as claimed in claim 1 wherein R and R'' each have less than 8 carbon atoms.

3. A complex having the formula $$[(Me_3SiCH_2)_2S]_2PtCl_2$$

wherein Me represents the methyl radical.

4. A complex having the formula $$(Me_3SiCH_2SCH_2CH_3)_2PtCl_2$$

wherein Me represents the methyl radical.

5. A complex having the formula $$(Me_3SiCH_2SBu)_2PtCl_2$$

wherein Me and Bu represent the methyl and n-butyl radicals respectively.

6. A process for preparing a platinum (II) complex which comprises reacting together in an aqueous meduim (i) an alkali metal chloroplatinite or ammonium chloroplatinite and (ii) a silicon-containing sulphide having the general formula R'R''S, wherein R' and R'' are as defined in claim 1.

7. A process as claimed in claim 6 wherein the aqueous medium comprises a mixture of water and a water-miscible organic solvent.

* * * * *